6084X
B. ZOLL & J. DOYLE.
MAKING SOAP.
Patented July 19, 1830.
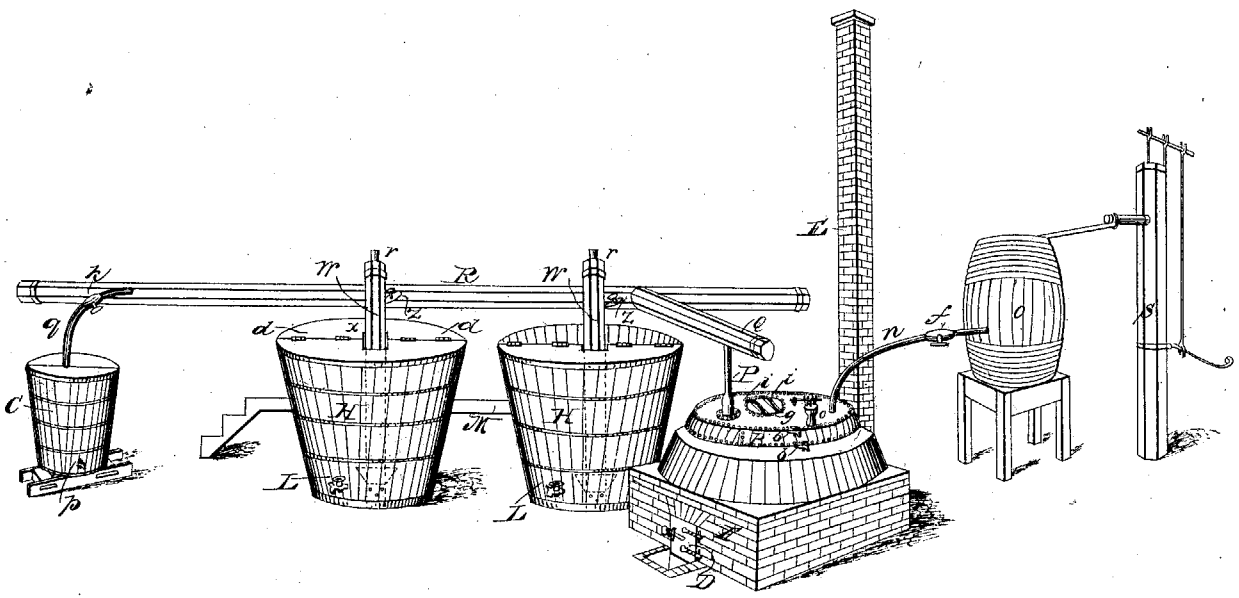

Bernard Zoll and James Doyle of Baltimore Md.

Letters Patent.

The Schedule referred to in these Letters Patent and making part of the same containing
a description in the words of the said Bernard Zoll and James Doyle themselves
of their improvement in the art of making Soap by the application of Steam.

To all to whom these Presents shall come. Be it known that We Bernard
Zoll and James Doyle of the City of Baltimore and State of Maryland have inven-
ted a new and useful improvement in the art of making Soap by the application
of Steam to that purpose, and that the following is a full and exact description
of the construction and operation of our said improvement as invented by us.
In the annexed drawing (F.) represents the fl---- D the fire door with the ash-
hole under it. and (E) the chimney. (B.) is the Steam Boiler with a saf-
ty valve at (a). two stop cocks at b.b. for regulating the water line therein.
a plate (g) secured by screw rivets and strong iron cross bars l.l. so as to admit
of its being removed. for the purpose of cleaning out the boiler and an iron Steam
pipe P. which conveys the steam from the boiler to the wooden conducting pipes
Q.R. which latter may also be of copper or iron. but we find well banded wood
en pipes to answer the purpose equally well if not better. for they are sufficiently
strong to resist the pressure of the steam and serve better to keep the heat. O. is
a reservoir (which may be a hogshead or pipe) elevated upon a frame above the
boiler and supplied from the pump (S) it communicates with the boiler by the
tube (n) which has a stop cock at (f) for admitting water into the Boiler
H.H. are large conical wooden boilers which may also be of iron or copper. but we
prefer wood the number of which may be multiplied as occasion requires also their
height may be Regulated so as to suit the Building in which they are to be placed.
each of them has a large stop cock at (I) and is covered with a close lid which
is in two pieces and supplied with hinges (d.d.) so as to admit the halves (x.x)
to be opened. (W.W.) are wooden tubes connected by means of lateral tubes and
stop cocks z.z. with the conduct— R. and descending through the lids or cov
erings of the vessels H.H. to — bottoms on which they rest. are longitudinally
perforated within — inch or two of their lower extremities as seen dotted
in the drawing. they have a collar or flange immediately above the perforations

[illegible]

X608[illegible]

for the purpose of giving the steam more circulation through the liquor contained in the
Boilers and at their upper extremities are closed with wooden plugs or spiggots
r.r. M is a stage or platform [illegible] for the purpose of raising the workmen so as to
enable them to stir the contents of the boilers H H. The raw materials form-
ing the soap being prepared in the common way now in practice are put into
the Boilers H H. after which the steam boiler B is filled with water from the
reservoir and pump. the steam arising from the boiler fills the conducting tube R. which
being closed at both ends. on the stop cocks Z Z. being opened the steam enters &
descends the tubes W.W. and the steam pressure being increased if necessary
it will continue to descend displacing the Ley &c till it escapes through the
perforations at the foot of the tubes. this operation and stirring occasionally is con-
tinued till the soap in the boilers H.H. is finished and fit to be dipped off.
it is then framed in the usual way. the waste ley being discharged from the
boilers through the cocks L L. The spiggots r.r. are intended to prevent accidents
in very cold weather; for it sometimes happens that the soap or ley congeals in
the tubes W.W. during the night. a— particular attention must be paid to
taking out the spiggots r.r. ....... removing the obstructions before the steam
is admitted. The advan..... of our method over the old way of boiling Soap.
are. 1st. that it requires much less stirring and although the temperature of
of the liquor is kept up much higher than in the old way. the soap is not at
all subject to being burnt which frequently happens during the process in the old
way. it makes the soap brighter and saves a large percentage of fuel. there is also
no risque of breaking Kettles. which is a very common accident in the old way of boil-
ing. In addition to the soap boilers H.H. we also have, connected with the conduc-
tor R a tallow melter (C) which is a wooden, iron, or copper vessel covered
close and enclosing a worm (as dotted in the figure) which connects with the
conductor R by the tube (g); the steam passing through the worm keeps the tallow
in the melter in a proper state for dipping or moulding candles and the temperature
can be increased or abated at will by shutting off more or less of the steam by the
by the stop cock (k) the melter also has a stop cock (p.) for drawing off the tallow
as it is wanted. also the top is contrived to be taken off for the purpose of introdu-
cing tallow. Now what we claim as new and as our invention or improve-
ment is the application of steam to making Soap and the [illegible] machinery

[illegible] as specified for that purpose. Given under our hands and dated this [illegible] day of July [illegible]

Witnesses
John [illegible]
Richard Gray

Bernard Zoll Exr.
James Doyle Wifl.

1056 word

[illegible] in part eaten by mice